(12) United States Patent  (10) Patent No.: US 8,954,108 B2
Tseng et al.  (45) Date of Patent: Feb. 10, 2015

(54) MOBILE APPARATUS, BASE STATION, DIRECT COMMUNICATION SYSTEM AND POWER CONTROL METHOD THEREOF

(71) Applicant: Institute for Information Industry, Taipei (TW)

(72) Inventors: Hsien-Wei Tseng, Kaohsiung (TW); Yih-Guang Jan, Taipei (TW); Yang-Han Lee, Zhongli (TW); Chih-Yuan Lo, Tainan (TW); Liang-Yu Yen, Tainan (TW); Chun-Che Chien, Taipei (TW)

(73) Assignee: Institute for Information Industry, Taipei (TW)

( * ) Notice: Subject to any disclaimer, the term of this patent is extended or adjusted under 35 U.S.C. 154(b) by 214 days.

(21) Appl. No.: 13/662,688

(22) Filed: Oct. 29, 2012

(65) Prior Publication Data

US 2013/0109430 A1  May 2, 2013

Related U.S. Application Data

(60) Provisional application No. 61/553,958, filed on Nov. 1, 2011, provisional application No. 61/553,960, filed on Nov. 1, 2011.

(51) Int. Cl.
*H04B 7/00* (2006.01)
*H04W 52/24* (2009.01)
*H04W 52/38* (2009.01)
(Continued)

(52) U.S. Cl.
CPC .......... *H04W 52/247* (2013.01); *H04W 52/383* (2013.01); *H04W 52/08* (2013.01); *H04W 52/243* (2013.01); *Y02B 60/50* (2013.01)

USPC ............................................. 455/522; 455/69

(58) Field of Classification Search
USPC .................................................. 455/69, 522
See application file for complete search history.

(56) References Cited

U.S. PATENT DOCUMENTS

2003/0125067 A1  7/2003  Takeda et al.
2007/0066240 A1*  3/2007  Hart ................................ 455/69
(Continued)

FOREIGN PATENT DOCUMENTS

CN  1430452  7/2003
TW  200948108  11/2009

OTHER PUBLICATIONS

Office Action for the Taiwanese counterpart application to the present US application by the Taiwan Intellectual Property Office, Aug. 22, 2014, 6 pages.

(Continued)

*Primary Examiner* — Lee Nguyen
(74) *Attorney, Agent, or Firm* — Skaar Ulbrich Macari, P.A.

(57) ABSTRACT

A mobile apparatus, a base station, a direct communication system and a power control method thereof are provided. The direct communication system includes the mobile apparatus and the base station. The base station transmits a power measurement request message to the mobile apparatus. The mobile apparatus determines a power adjustment reference between the mobile apparatus and another mobile apparatus according to the power measurement request message. One of the mobile apparatus and the base station generates a power adjustment request message according to the power adjustment reference. The mobile apparatus adjusts a communication power with the another mobile apparatus according to the power adjustment request message.

22 Claims, 7 Drawing Sheets

(51) Int. Cl.
*H04M 1/00* (2006.01)
*H04W 52/08* (2009.01)

(56) References Cited

U.S. PATENT DOCUMENTS

2009/0247166 A1 10/2009 Luo et al.
2009/0325625 A1 12/2009 Hugl et al.
2013/0295983 A1* 11/2013 Kim et al. .................... 455/522

OTHER PUBLICATIONS

Office Action for the Chinese counterpart application to the present US application rendered by the State Intellectual Property Office of China (SIPO) on Dec. 3, 2014, 8 pages.

* cited by examiner

MOBILE APPARATUS, BASE STATION, DIRECT COMMUNICATION SYSTEM AND POWER CONTROL METHOD THEREOF

PRIORITY

This application claims the benefit of priority based on U.S. Provisional Applications Ser. No. 61/553,958 filed on Nov. 1, 2011 and 61/553,960 filed on Nov. 1, 2011, which are both hereby incorporated by reference herein in their entirety.

FIELD

The present invention relates to a mobile apparatus, a base station, a direct communication system and a power control method thereof. More particularly, the mobile apparatus, the base station, the direct communication system and the power control method thereof of the present invention are adapted to adjust a communication power between mobile apparatuses efficiently.

BACKGROUND

Generally in conventional power adjustment methods for wireless communication apparatuses, a base station in a network transmits a reference signal to a wireless communication apparatus. Then, the wireless communication apparatus determines a degree to which the signal from the base station is attenuated, and the signal transmission power is adjusted correspondingly. However, the conventional power adjustment methods are mainly adapted to adjust the message transmission power between wireless communication apparatuses and the base station, but cannot adjust the message transmission power between the wireless communication apparatuses effectively.

In detail, if there is a plurality of wireless communication apparatuses within the same network communication coverage and these wireless communication apparatuses have to communicate with each other directly (Direct Communication), then those having a higher message transmission power will present a high signal transmission energy, which tends to interfere with signals of other wireless communication apparatuses excessively. On the other hand, those having a lower message transmission power will present a low signal transmission energy and, consequently, a smaller signal coverage; and moreover, signals from such wireless communication apparatuses having a lower message transmission power are liable to interferences from other signals. Therefore, a too high power and a too low power of the wireless communication apparatuses both degrade the overall transmission efficiency of the network significantly.

Accordingly, an urgent need exists in the art to provide a solution capable of adjusting the power of wireless communication apparatuses accurately so that signal interferences between the wireless communication apparatuses can be mitigated and signals can be transmitted properly to improve the message transmission efficiency between the wireless communication apparatuses.

SUMMARY

To solve the aforesaid problem, the present invention provides a mobile apparatus, a base station, a direct communication system and a power control method thereof, which are mainly used for mobile apparatuses that can communicate directly with each other to adjust the communication power between the mobile apparatuses efficiently.

To achieve the aforesaid objective, the present invention in certain embodiments provides a power control method for a direct communication system. The direct communication system comprises a base station and a first mobile apparatus. The power control method comprises the following steps of: (a) enabling the base station to transmit a power measurement request message to the first mobile apparatus; (b) enabling the first mobile apparatus to determine a power adjustment reference between the first mobile apparatus and a second mobile apparatus according to the power measurement request message; (c) enabling one of the first mobile apparatus and the base station to generate a power adjustment request message according to the power adjustment reference; and (d) enabling the first mobile apparatus to adjust a communication power with the second mobile apparatus according to the power adjustment request message.

To achieve the aforesaid objective, the present invention according to certain embodiments further provides a direct communication system, which comprises a base station and a first mobile apparatus. The base station transmits a power measurement request message to the first mobile apparatus. The first mobile apparatus determines a power adjustment reference between the first mobile apparatus and a second mobile apparatus according to the power measurement request message. One of the first mobile apparatus and the base station generates a power adjustment request message according to the power adjustment reference. The first mobile apparatus adjusts a communication power with the second mobile apparatus according to the power adjustment request message.

To achieve the aforesaid objective, the present invention according to certain embodiments further provides a power control method for a base station. The base station is used in a direct communication system, and the direct communication system further comprises a first mobile apparatus. The power control method comprises the following steps of: (a) enabling the base station to transmit a power measurement request message to the first mobile apparatus, so that the first mobile apparatus determines a power adjustment reference between the first mobile apparatus and a second mobile apparatus according to the power measurement request message; (b) enabling the base station to receive the power adjustment reference from the first mobile apparatus; (c) enabling the base station to generate a power adjustment request message according to the power adjustment reference; and (d) enabling the base station to transmit the power adjustment request message to the first mobile apparatus, so that the first mobile apparatus adjusts a communication power with the second mobile apparatus according to the power adjustment request message.

To achieve the aforesaid objective, the present invention according to certain embodiments further provides a base station for a direct communication system. The direct communication system further comprises a first mobile apparatus. The base station comprises a transceiver and a processor. The transceiver is configured to transmit a power measurement request message to the first mobile apparatus, so that the first mobile apparatus determines a power adjustment reference between the first mobile apparatus and a second mobile apparatus according to the power measurement request message. The transceiver is further configured to receive the power adjustment reference from the first mobile apparatus. The processor is configured to generate a power adjustment request message according to the power adjustment reference. The transceiver is further configured to transmit the power adjustment request message to the first mobile apparatus, so that the first mobile apparatus adjusts a communication power with the second mobile apparatus according to the power adjustment request message.

To achieve the aforesaid objective, the present invention according to certain embodiments further provides a power control method for a first mobile apparatus. The first mobile apparatus is used in a direct communication system, and the direct communication system further comprises a base station. The power control method comprises the following steps of: (a) enabling the first mobile apparatus to receive a power measurement request message from the base station; (b) enabling the first mobile apparatus to determine a power adjustment reference between the first mobile apparatus and a second mobile apparatus according to the power measurement request message; (c) enabling the first mobile apparatus to generate a power adjustment request message according to the power adjustment reference; and (d) enabling the first mobile apparatus to adjust a communication power with the second mobile apparatus according to the power adjustment request message.

To achieve the aforesaid objective, the present invention according to certain embodiments further provides a first mobile apparatus for a direct communication system. The direct communication system further comprises a base station. The first mobile apparatus comprises a transceiver and a processor. The transceiver is configured to receive a power measurement request message from the base station. The processor is configured to determine a power adjustment reference between the processor and a second mobile apparatus according to the power measurement request message. The processor is further configured to generate a power adjustment request message according to the power adjustment reference and adjust a communication power with the second mobile apparatus according to the power adjustment request message.

With the technical features disclosed above, the mobile apparatus, the base station, the direct communication system and the power control method thereof of the present invention can adjust the communication power between the mobile apparatuses more efficiently.

DETAILED DESCRIPTION

In the following description, the present invention will be explained with reference to example embodiments thereof. However, these embodiments are not intended to limit the present invention to any specific environment, example, embodiment, applications or particular implementations described in these embodiments. Therefore, description of these example embodiments is only for purpose of illustration rather than to limit the present invention. It should be appreciated that, in the following embodiments and the attached drawings, elements unrelated to the present invention are omitted from depiction.

Figure 1A:
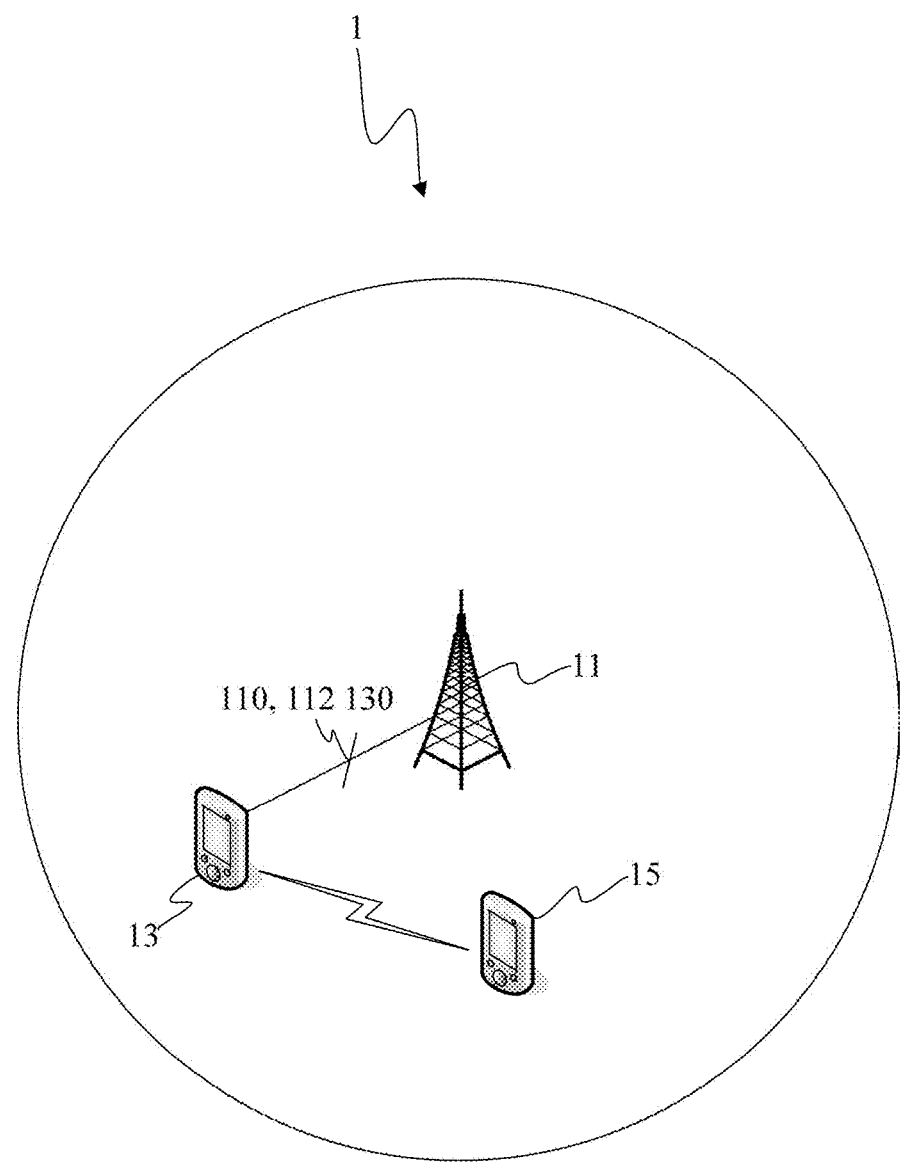
FIG. 1A is a schematic view of a direct communication system according to a first embodiment of the present invention.
Figure 1B:
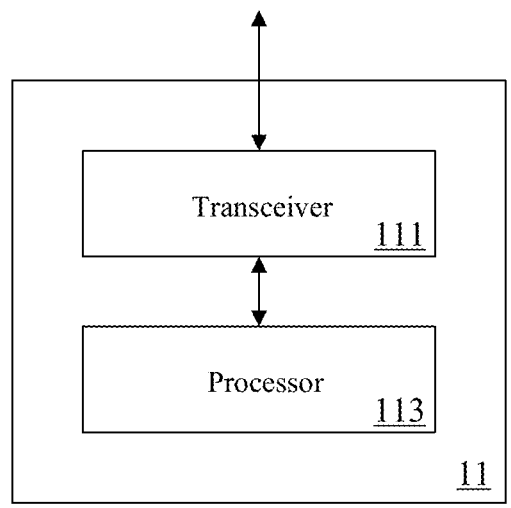
FIG. 1B is a schematic view of a base station according to the first embodiment of the present invention.
Figure 1C:
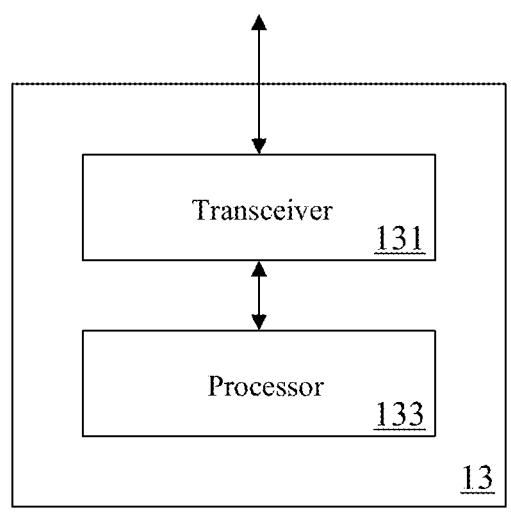
FIG. 1C is a schematic view of a first mobile apparatus according to the first embodiment of the present invention.

Referring to FIGS. 1A-1C, FIG. 1A is a schematic view of a direct communication system 1 according to a first embodiment of the present invention, the direct communication system 1 comprising a first base station 11 and a first mobile apparatus 13. FIG. 1B is a schematic view of the base station 11 according to the first embodiment of the present invention. The base station 11 comprises a transceiver 111 and a processor 113. FIG. 1C is a schematic view of the first mobile apparatus 13 according to the first embodiment of the present invention. The first mobile apparatus 13 comprises a transceiver 131 and a processor 133. Interactions between the network elements will be further described hereinafter.

First, channel conditions between the base station 11 and different mobile apparatuses are determined by the base station 11 to facilitate evaluation of the power between the mobile apparatuses. In particular, after having evaluated the channel conditions between the base station 11 and the mobile apparatuses within a communication coverage thereof, the base station 11 transmits via the transceiver 111 to the first mobile apparatus 13 a power measurement request message 110 that notifies the first mobile apparatus 13 to start a power measurement.

Then, the power measurement request message 110 is received by the transceiver 131 of the first mobile apparatus 13, and a power adjustment reference 130 between the first mobile apparatus 13 and a second mobile apparatus 15 is determined by the processor 133 of the first mobile apparatus 13. It should be particularly noted that, the power adjustment reference between the mobile apparatuses can be determined according to factors such as an initial power therebetween, a distance or a channel quality therebetween; and since this can be readily appreciated by people skilled in the art, no further description will be made herein.

After the power adjustment reference 130 between the first mobile apparatus 13 and the second mobile apparatus 15 has been determined, how to adjust the power of the first mobile apparatus 13 can be further determined by the base station 11 or the first mobile apparatus 13. In detail, since the base station 11 connects with a plurality of mobile apparatuses simultaneously and has a high operational capability, the power necessary for the communication between the mobile apparatuses can be determined by the base station 11.

Further speaking, if the power adjustment is mainly carried out by the base station 11, the transceiver 111 of the base station 11 receives the power adjustment reference 130 from the first mobile apparatus 13 first. Then, the processor 113 of the base station 11 generates a power adjustment request message 112 through computation according to a related power adjustment algorithm and the power adjustment reference 130.

Subsequently, the transceiver 111 of the base station 11 transmits to the first mobile apparatus 13 the power adjustment request message 112 which notifies the first mobile apparatus 13 to adjust a communication power with the second mobile apparatus 15. In other words, after the transceiver 131 of the first mobile apparatus 13 receives the power adjustment request message 112, the processor 133 can arrange to adjust the communication power with the second mobile apparatus 15 according to the power adjustment request message 112 from the base station 11 to optimize the communication power between the first mobile apparatus 13 and the second mobile apparatus 15.

On the other hand, when the number of the mobile apparatuses increases, a lot of resources of the base station 11 will be consumed to compute the power necessary for communication between the mobile apparatuses. In this case, the communication power between the mobile apparatus and other mobile apparatuses may also be computed by the mobile apparatus itself to ease the burden of the base station 11.

In detail, the power adjustment may be mainly carried out by the first mobile apparatus 13. Accordingly, the processor 133 of the first mobile apparatus 13 can generate a power adjustment request message (not shown) directly through computation according to a power adjustment algorithm and the power adjustment reference 130, and further adjust the communication power with the second mobile apparatus 15 according to the power adjustment request message. In this way, the effect of optimizing the power adjustment can also be achieved.

Figure 2:
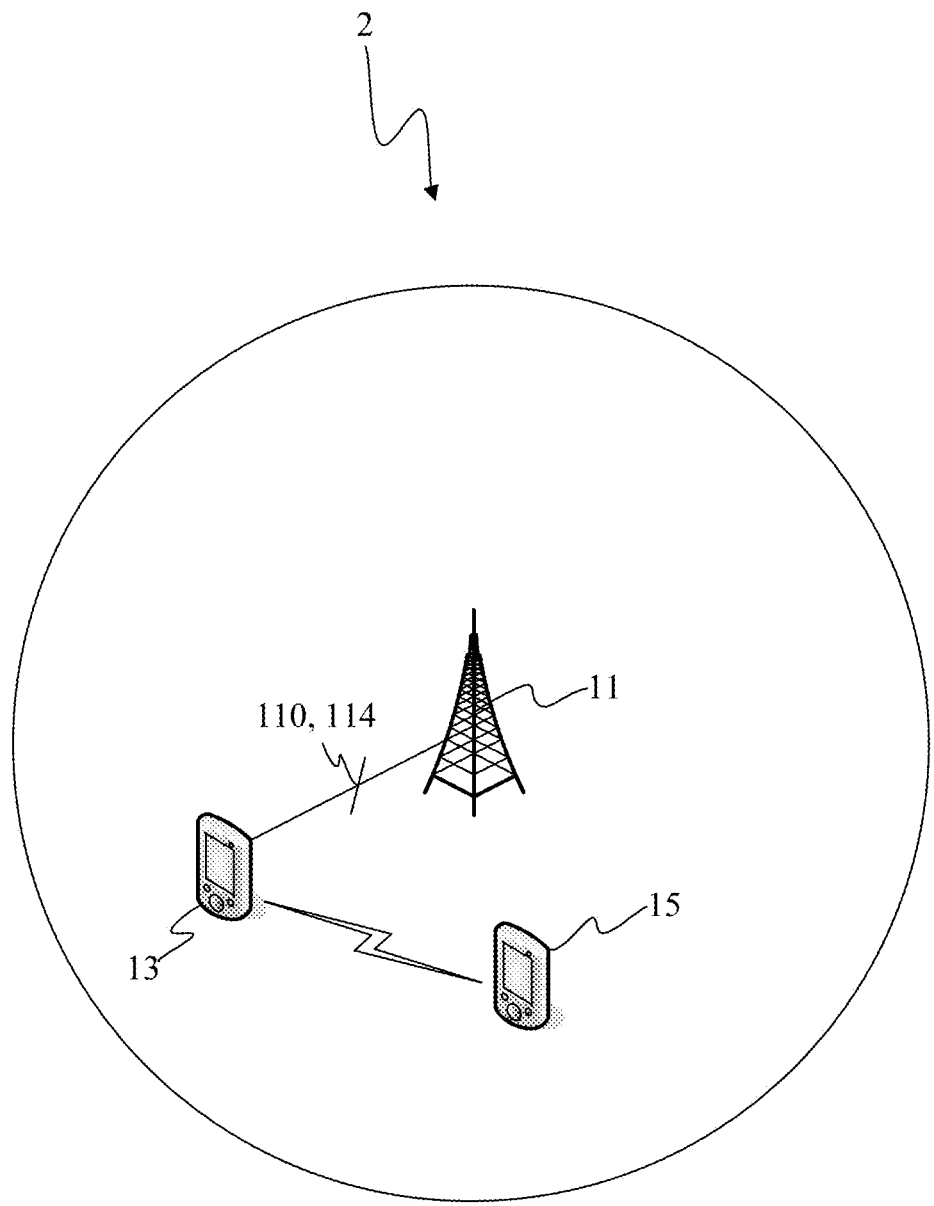
FIG. 2 is a schematic view of a direct communication system according to a second embodiment of the present invention.

Referring to FIG. 2, it is a schematic view of a direct communication system 2 according to a second embodiment of the present invention. It should be particularly noted that, the system architecture and the network connection environment in the second embodiment are the same as those of the first embodiment, so elements with like reference numerals also have like functions and will not be further described herein. However, the second embodiment is different from the first embodiment in that, an initial power adjustment may be firstly carried out by the base station according to conditions of the mobile apparatuses in the second embodiment.

In particular, similarly, the base station 11 firstly evaluates the channel conditions between the base station 11 and the mobile apparatuses within the communication range thereof. Then, the transceiver 111 of the base station 11 transmits to the first mobile apparatus 13 the power measurement request message 110 which notifies the first mobile apparatus 13 to carry out the power measurement.

Meanwhile, the processor 111 of the base station 11 can further generate an initial adjustment request message 114 through computation according to a related power adjustment algorithm and information such as the channel conditions of the mobile apparatuses, and transmit the initial adjustment request message 114 to the first mobile apparatus 13 via the transceiver 11. Then after the transceiver 131 of the first mobile apparatus 13 receives the initial adjustment request message 114, the communication power with the second mobile apparatus 15 can be initially adjusted by the processor 135.

Likewise, after the transceiver 131 of the first mobile apparatus 13 receives the power measurement request message 110, a power adjustment reference (not shown) between the first mobile apparatus 13 and the second mobile apparatus 15 is determined by the processor 133. Then, the power adjustment is carried out mainly by the first mobile apparatus 13. Accordingly, the processor 133 of the first mobile apparatus 13 can generate a power adjustment request message (not shown) directly through computation according to a power adjustment algorithm and the power adjustment reference, and further adjust the communication power with the second mobile apparatus 15 according to the power adjustment request message.

It should be particularly noted that, in the second embodiment, the base station 11 and the first mobile apparatus 13 adjust the communication power between the first mobile apparatus 13 and the second mobile apparatus 15 more than once; however, it is not intended to limit the order and times of the power adjustment. In other words, the base station 11 and the first mobile apparatus 13 may repeat adjustment of the message transmission power according to the communication conditions between the first mobile apparatus 13 and the second mobile apparatus 15 after the power adjustments. Because the repeated processes of the power adjustments are the same as the previous description, the detail will not be further described.

Figure 3A:
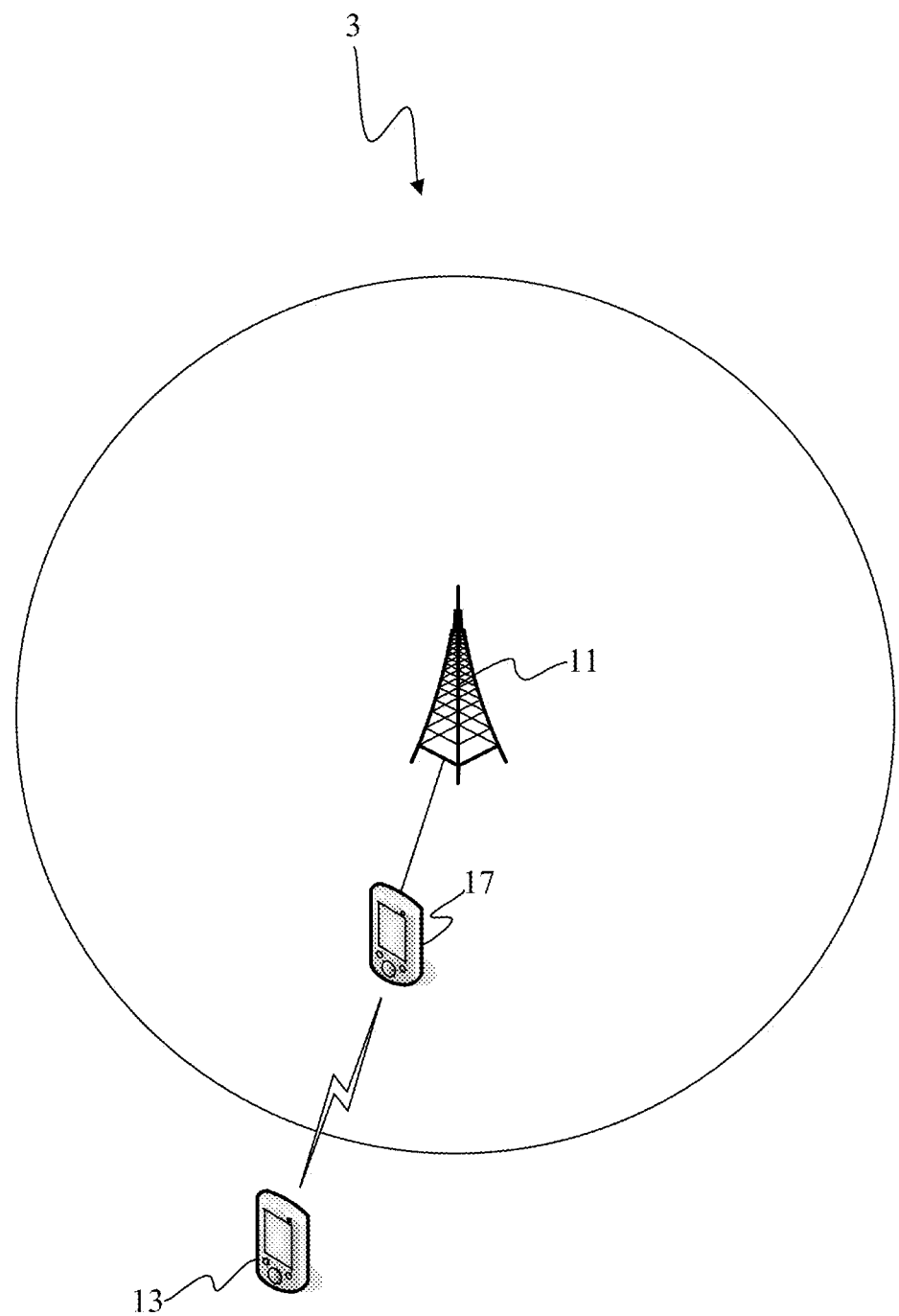
FIGS. 3A-3B are schematic views of direct communication systems according to a third embodiment of the present invention.
Figure 3B:
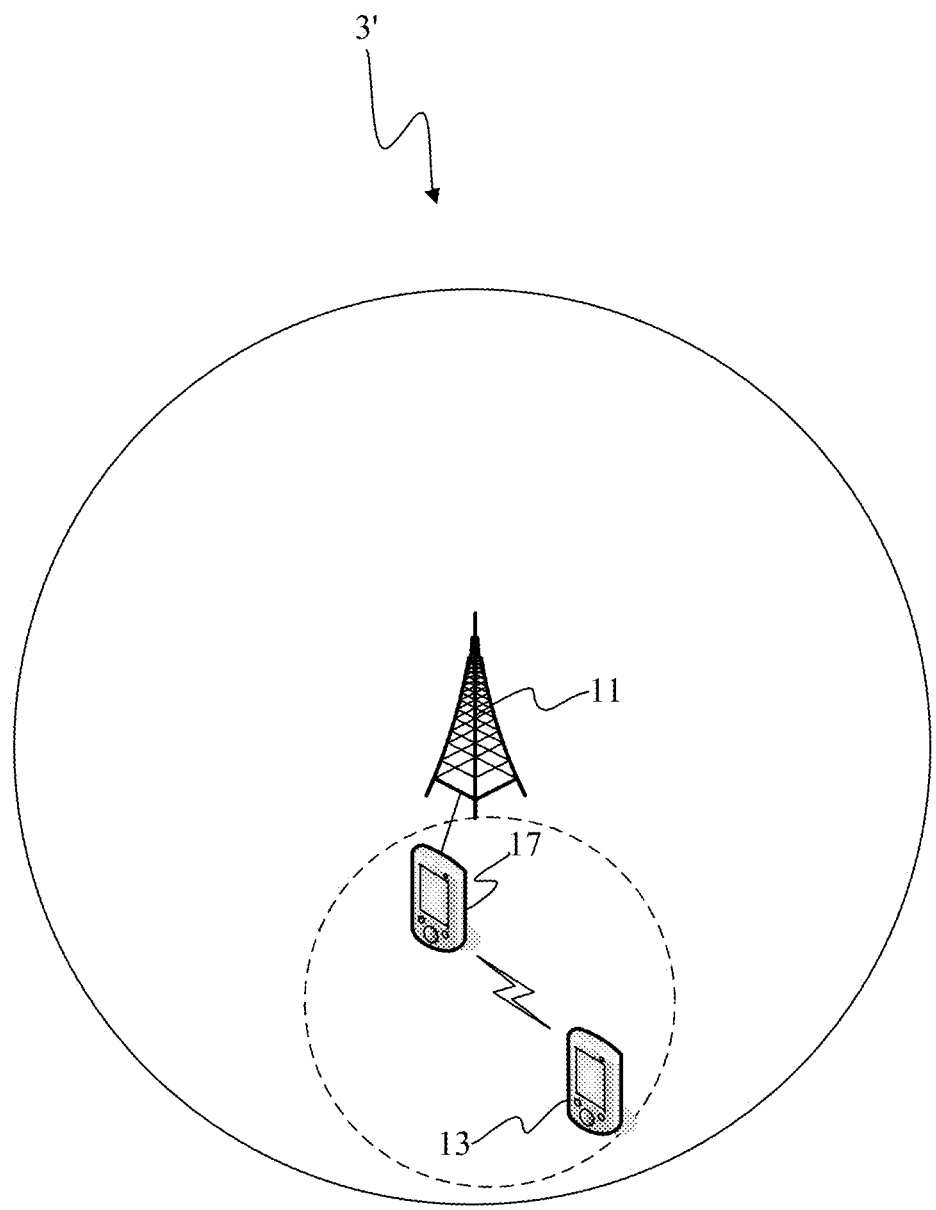

Referring to FIGS. 3A-3B, FIG. 3A is a schematic view of a direct communication system 3 according to a third embodiment of the present invention, and FIG. 3B is a schematic view of a direct communication system 3' according to the third embodiment of the present invention. It should be particularly noted that, the system architecture and the network connection environment in the third embodiment are the same as those of the previous embodiments, so elements with like reference numerals also have like functions and will not be further described herein. However, the third embodiment is different from the previous embodiments in that, the mobile apparatuses in the third embodiment can communicate with the base station through relaying and further complete the power adjustment.

As shown in FIG. 3A, the first mobile apparatus 13 is located outside the communication coverage of the base station 11, so the first mobile apparatus 13 communicates with the base station 11 mainly via a third mobile apparatus 17. In other words, the third mobile apparatus 17 acts as a relay station between the first mobile apparatus 13 and the base station 11.

It should be noted that, although the first mobile apparatus 13 has to connect with the base station 11 via the third mobile apparatus 17 in the network environment shown in FIG. 3A, the messages exchanged between the first mobile apparatus 13 and the base station 11 makes no difference. In other words, the process flow of the power adjustment is also the same as that of the previous embodiments, and the only difference lies in whether the message is transmitted directly or indirectly.

Similarly, as shown in FIG. 3B, although the first mobile apparatus 13 is located inside the communication coverage of the base station 11, the messages from the first mobile apparatus 13 can still be relayed to the base station 11 via the third mobile apparatus 17 by grouping the mobile apparatuses together, thus completing the power adjustment of the first mobile apparatus 13. It should be particularly stressed that, for ease of understanding, the third mobile apparatus is additionally provided in the third embodiment for purpose of illustration; however, this is not intended to limit the implementations of the present invention, and in other embodiments, the role of a relay station may also be played by the second mobile apparatus directly.

Figure 4:
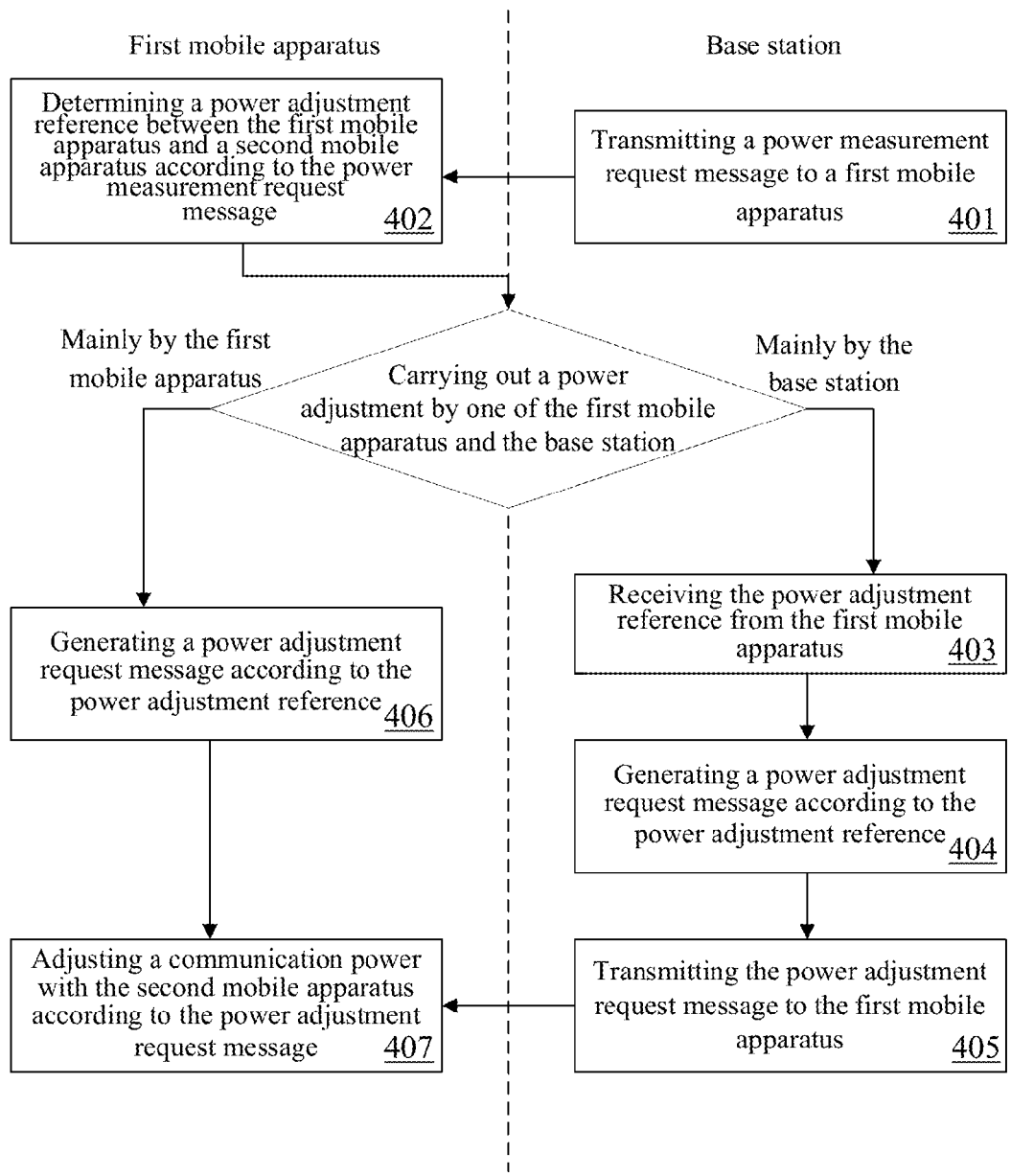
FIG. 4 is a flowchart diagram illustrating a power adjustment method according to a fourth embodiment of the present invention.

A fourth embodiment of the present invention is a power adjustment method, a flowchart diagram of which is shown in FIG. 4. The method of the fourth embodiment is used for a direct communication system (e.g., the direct communication system 1 of the previous embodiment) as well as a base station and a first mobile apparatus (e.g., the base station 11 and the first mobile apparatus 13 of the previous embodiments) that are comprised in the direct communication system. Steps of the fourth embodiment are detailed as follows.

First, step 401 is executed to enable the base station to transmit a power measurement request message to the first mobile apparatus. Step 402 is executed to enable the first mobile apparatus to determine a power adjustment reference between the first mobile apparatus and the second mobile apparatus according to the power measurement request message. Subsequently, a power adjustment request message is generated by one of the first mobile apparatus and the base station according to the power adjustment reference.

Further speaking, if the power adjustment is carried out mainly by the base station, step 403 is executed to enable the base station to receive the power adjustment reference from the first mobile apparatus. Then, step 404 is executed to enable the base station to generate the power adjustment request message according to the power adjustment reference. Step 405 is executed to enable the base station to transmit the power adjustment request message to the first mobile apparatus. Finally, step 407 is executed to enable the first mobile apparatus to adjust a communication power with the second mobile apparatus according to the power adjustment request message.

On the other hand, if the power adjustment is carried out mainly by the first mobile apparatus, step 406 is executed to enable the first mobile apparatus to generate the power adjustment request message according to the power adjustment reference. Finally, step 407 is executed to enable the first mobile apparatus to adjust the communication power with the second mobile apparatus according to the power adjustment request message.

Figure 5:
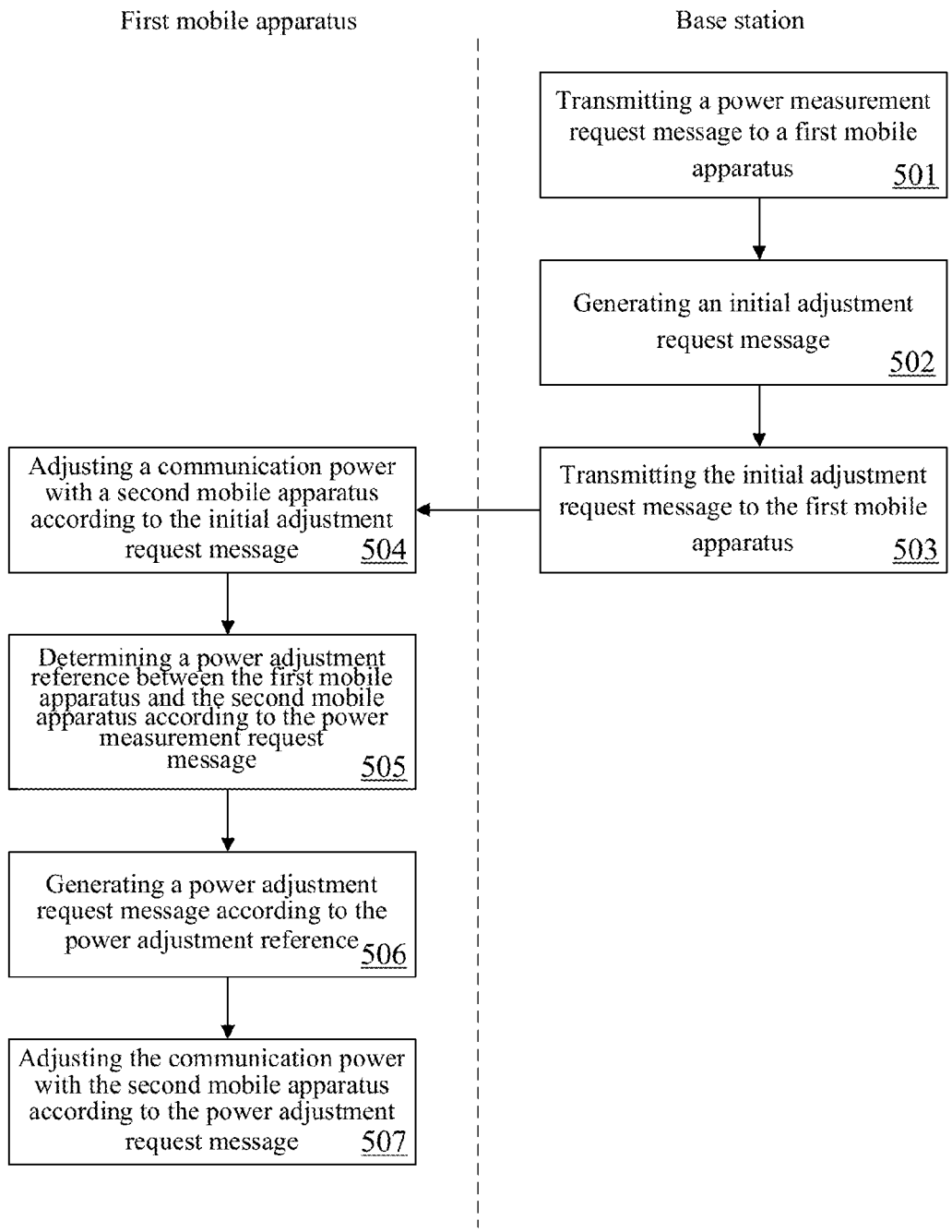
FIG. 5 is a flowchart diagram illustrating a power adjustment method according to a fifth embodiment of the present invention.

A fifth embodiment of the present invention is a power adjustment method, a flowchart diagram of which is shown in FIG. 5. The method of the fifth embodiment is used for a direct communication system (e.g., the direct communication system 2 of the previous embodiment) as well as a base station and a first mobile apparatus (e.g., the base station 11 and the first mobile apparatus 13 of the previous embodiments) that are comprised in the direct communication system. Steps of the fifth embodiment are detailed as follows.

First, step 501 is executed to enable the base station to transmit a power measurement request message to the first mobile apparatus. Step 502 is executed to enable the base station to generate an initial adjustment request message. Step 503 is executed to enable the base station to transmit the initial adjustment request message to the first mobile apparatus. Step 504 is executed to enable the first mobile apparatus to adjust a communication power with the second mobile apparatus according to the initial adjustment request message.

Subsequently, step 505 is executed to enable the first mobile apparatus to determine a power adjustment reference between the first mobile apparatus and the second mobile apparatus according to the power measurement request message. Then, the power adjustment is carried out mainly by the first mobile apparatus. Step 506 is executed to enable the first mobile apparatus to generate the power adjustment request message according to the power adjustment reference. Finally, step 507 is executed to enable the first mobile apparatus to adjust the communication power with the second mobile apparatus according to the power adjustment request message.

It should be noted again that, in the aforesaid embodiments of the power adjustment methods, the base station and the first mobile apparatus can transmit messages to each other via a third mobile apparatus when no direction connection exists therebetween. In other words, the third mobile apparatus acts as a relay station between the base station and the first mobile apparatus. Likewise, the third mobile apparatus is additionally provided for purpose of illustration, but is not intended to limit the implementations of the present invention; and in other embodiments, the role of a relay station may also be played by the second mobile apparatus directly.

According to the above descriptions, the mobile apparatus, the base station, the direct communication system and the power control method thereof of the present invention can adjust the communication power between the mobile apparatuses in a more efficient way when the mobile apparatuses communicate with each other directly so as to improve the overall transmission efficiency of the network messages.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A power control method for a direct communication system, the direct communication system comprising a base station and a first mobile apparatus, the power control method comprising the steps of:
    (a) enabling the base station to transmit a power measurement request message to the first mobile apparatus;
    (b) enabling the first mobile apparatus to determine a power adjustment reference between the first mobile apparatus and a second mobile apparatus according to the power measurement request message;
    (c) enabling one of the first mobile apparatus and the base station to generate a power adjustment request message according to the power adjustment reference; and
    (d) enabling the first mobile apparatus to adjust a communication power with the second mobile apparatus according to the power adjustment request message.

2. The power control method as claimed in claim 1, wherein the step (c) further comprises the steps of:
    (c1) enabling the base station to receive the power adjustment reference from the first mobile apparatus;
    (c2) enabling the base station to generate the power adjustment request message according to the power adjustment reference; and
    (c3) enabling the base station to transmit the power adjustment request message to the first mobile apparatus.

3. The power control method as claimed in claim 1, wherein the step (c) further comprises the step of:
    (c1) enabling the first mobile apparatus to generate the power adjustment request message according to the power adjustment reference.

4. The power control method as claimed in claim 3, further comprising the following steps after the step (a):
    (a1) enabling the base station to generate an initial adjustment request message;
    (a2) enabling the base station to transmit the initial adjustment request message to the first mobile apparatus; and
    (a3) enabling the first mobile apparatus to adjust the communication power with the second mobile apparatus according to the initial adjustment request message.

5. The power control method as claimed in claim 1, wherein the base station and the first mobile apparatus transmit messages to each other via a third mobile apparatus.

6. A direct communication system, comprising:
    a base station; and
    a first mobile apparatus;
    wherein the base station transmits a power measurement request message to the first mobile apparatus, the first mobile apparatus determines a power adjustment reference between the first mobile apparatus and a second mobile apparatus according to the power measurement request message, one of the first mobile apparatus and the base station generates a power adjustment request message according to the power adjustment reference, and the first mobile apparatus adjusts a communication power with the second mobile apparatus according to the power adjustment request message.

7. The direct communication system as claimed in claim 6, wherein the base station further receives the power adjustment reference from the first mobile apparatus and generates the power adjustment request message according to the power adjustment reference, and the first mobile apparatus further receives the power adjustment request message from the base station.

8. The direct communication system as claimed in claim 6, wherein the first mobile apparatus further generates the power adjustment request message according to the power adjustment reference.

9. The direct communication system as claimed in claim 8, wherein the base station further generates an initial adjustment request message and transmits the initial adjustment request message to the first mobile apparatus, and the first mobile apparatus adjusts the communication power with the second mobile apparatus according to the initial adjustment request message.

10. The direct communication system as claimed in claim 6, wherein the base station and the first mobile apparatus transmit messages to each other via a third mobile apparatus.

11. A power control method for a base station, the base station being used in a direct communication system, and the direct communication system further comprising a first mobile apparatus, the power control method comprising the steps of:
    (a) enabling the base station to transmit a power measurement request message to the first mobile apparatus, so that the first mobile apparatus determines a power adjustment reference between the first mobile apparatus and a second mobile apparatus according to the power measurement request message;
    (b) enabling the base station to receive the power adjustment reference from the first mobile apparatus;
    (c) enabling the base station to generate a power adjustment request message according to the power adjustment reference; and
    (d) enabling the base station to transmit the power adjustment request message to the first mobile apparatus, so that the first mobile apparatus adjusts a communication power with the second mobile apparatus according to the power adjustment request message.

12. The power control method as claimed in claim 11, further comprising the following steps after the step (a):
    (a1) enabling the base station to generate an initial adjustment request message; and
    (a2) enabling the base station to transmit the initial adjustment request message to the first mobile apparatus, so that the first mobile apparatus adjusts the communication power with the second mobile apparatus according to the initial adjustment request message.

13. The power control method as claimed in claim 11, wherein the base station and the first mobile apparatus transmit messages to each other via a third mobile apparatus.

14. A base station for a direct communication system, the direct communication system further comprising a first mobile apparatus, the base station comprising:
    a transceiver; and
    a processor;
    wherein the transceiver is configured to transmit a power measurement request message to the first mobile apparatus, so that the first mobile apparatus determines a power adjustment reference between the first mobile apparatus and a second mobile apparatus according to the power measurement request message, the transceiver is further configured to receive the power adjustment reference from the first mobile apparatus, the processor is configured to generate a power adjustment request message according to the power adjustment reference, and the transceiver is further configured to transmit the power adjustment request message to the first mobile apparatus, so that the first mobile apparatus adjusts a communication power with the second mobile apparatus according to the power adjustment request message.

15. The base station as claimed in claim 14, wherein the processor is further configured to generate an initial adjustment request message, and the transceiver is further configured to transmit the initial adjustment request message to the first mobile apparatus so that the first mobile apparatus adjusts the communication power with the second mobile apparatus according to the initial adjustment request message.

16. The base station as claimed in claim 14, wherein the base station and the first mobile apparatus transmit messages to each other via a third mobile apparatus.

17. A power control method for a first mobile apparatus, the first mobile apparatus being used in a direct communication system, and the direct communication system further comprising a base station, the power control method comprising the steps of:
    (a) enabling the first mobile apparatus to receive a power measurement request message from the base station;
    (b) enabling the first mobile apparatus to determine a power adjustment reference between the first mobile apparatus and a second mobile apparatus according to the power measurement request message;
    (c) enabling the first mobile apparatus to generate a power adjustment request message according to the power adjustment reference; and
    (d) enabling the first mobile apparatus to adjust a communication power with the second mobile apparatus according to the power adjustment request message.

18. The power control method as claimed in claim 17, further comprising the following steps after the step (a):
    (a1) enabling the first mobile apparatus to receive an initial adjustment request message from the base station; and
    (a2) enabling the first mobile apparatus to adjust the communication power with the second mobile apparatus according to the initial adjustment request message.

19. The power control method as claimed in claim 17, wherein the base station and the first mobile apparatus transmit messages to each other via a third mobile apparatus.

20. A first mobile apparatus for a direct communication system, the direct communication system further comprising a base station, the first mobile apparatus comprising:
    a transceiver; and
    a processor;
    wherein the transceiver is configured to receive a power measurement request message from the base station, the processor is configured to determine a power adjustment reference between the processor and a second mobile apparatus according to the power measurement request message, and the processor is further configured to generate a power adjustment request message according to the power adjustment reference and adjust a communication power with the second mobile apparatus according to the power adjustment request message.

21. The first mobile apparatus as claimed in claim 20, wherein the transceiver is further configured to receive an initial adjustment request message from the base station, and the processor is further configured to adjust the communication power with the second mobile apparatus according to the initial adjustment request message.

22. The first mobile apparatus as claimed in claim 20, wherein the base station and the first mobile apparatus transmit messages to each other via a third mobile apparatus.

* * * * *